Nov. 18, 1969  F. RUEMPELEIN  3,479,595

ELECTRICAL CORE-MAGNET MEASURING INSTRUMENT

Filed March 26, 1965  2 Sheets-Sheet 1

INVENTOR.
FRITZ RUEMPELEIN

BY Michael J. Striker

United States Patent Office 3,479,595
Patented Nov. 18, 1969

3,479,595
ELECTRICAL CORE-MAGNET MEASURING INSTRUMENT
Fritz Ruempelein, Munich, Germany, assignor to Agfa Aktiengesellschaft, Leverkusen, Germany
Filed Mar. 26, 1965, Ser. No. 442,879
Claims priority, application Germany, Apr. 24, 1964, 1,466,624
Int. Cl. G01r 1/16
U.S. Cl. 324—151                    12 Claims

ABSTRACT OF THE DISCLOSURE

A core-magnet electrical measuring instrument wherein the circular chamber of an open-ended housing accommodates an annular magnetic core surrounding the hub of a plastic holder having two jaws provided with arcuate slots for a ring-shaped magnetic yoke which surrounds the core. The moving coil has coaxial arbors mounted in sockets respectively provided on the boss and on a shaft which is threadedly connected to the holder. The pointer of the coil is movable in front of an arcuate scale-bearing member which is detachably supported by a back support of the housing and is located behind a transparent cap secured to the housing by two end walls.

---

The present invention relates to electrical measuring instruments in general, and more particularly to an improved core-magnet moving-coil instrument of the type which may be utilized in an exposure meter for photographic cameras or the like as level indicator.

It is an important object of my invention to provide a core-magnet moving-coil instrument which is constructed in such a way that its parts may be mass-produced and assembled in simple machinery.

Another object of the invention is to provide a very simple, compact and relatively inexpensive core-magnet moving-coil instrument.

A further object of the invention is to provide a novel housing and a novel holder for the magnets of the improved instrument and to provide a novel mounting for the frame of the moving coil.

An additional object of the invention is to provide a novel method of assembling prefabricated components of a core-magnet moving-coil instrument.

Still another object of the invention is to provide a readily adjustable bearing unit for the moving core.

A concomitant object of the invention is to provide a readily accessible and readily removable scale-bearing member for use in the above outlined instrument.

Briefly stated, one feature of my present invention resides in the provision of a core-magnet moving-coil instrument which may be readily assembled or taken apart, which consists of a small number of prefabricated parts, and wherein the majority of such parts may be replaced, removed, inspected or adjusted in a very simple and time-saving manner.

The instrument comprises a substantially annular housing which is open at both ends and defines a substantially circular chamber, a scale-bearing strip which is detachably secured to a peripheral portion of the housing, a transparent cap which is located in front of the scale-bearing strip, a pair of end walls which are detachably secured to the housing and which are preferably provided with edge portions arranged to locate the cap in front of the scale-bearing member, a holder consisting of synthetic plastic material and accommodated in the chamber of the housing, a pair of slotted jaws extending from one side of the holder, an annular magnetic core surrounding a centrally located boss of the holder and located between the jaws, an annular or U-shaped magnetic yoke received in the slots of the jaws and spacedly surrounding the core, a moving coil surrounding a portion of the holder and having pivot members journalled at the opposite sides of the holder so that the coil may turn about the axis of the boss, a pointer connected with the coil and having a portion extending between the scale-bearing member and the cap so that such portion of the pointer is observable by looking through the cap, and a pair of current-conducting terminals each connected to the coil and non-rotatably secured to the holder. The housing and the end walls define suitable channels through which the terminals extend from the chamber so that each thereof may be connected to one pole of a source of electrical energy. The terminals also prevent angular displacements of the holder with reference to the housing. All or nearly all parts or the improved instrument are preferably connected to each other by welding, soldering or by resorting to a suitable adhesive.

The novel features which are considered as characteristic of the invention are set forth in particular in the appended claims. The improved moving-coil instrument itself, however, both as to its construction and the method of assembling the same, together with additional features and advantages thereof, will be best understood upon perusal of the following detailed description of a specific embodiment with reference to the accompanying drawings, in which:

FIG. 3 is a perspective view of a holder with a composite core.

Figure 1:
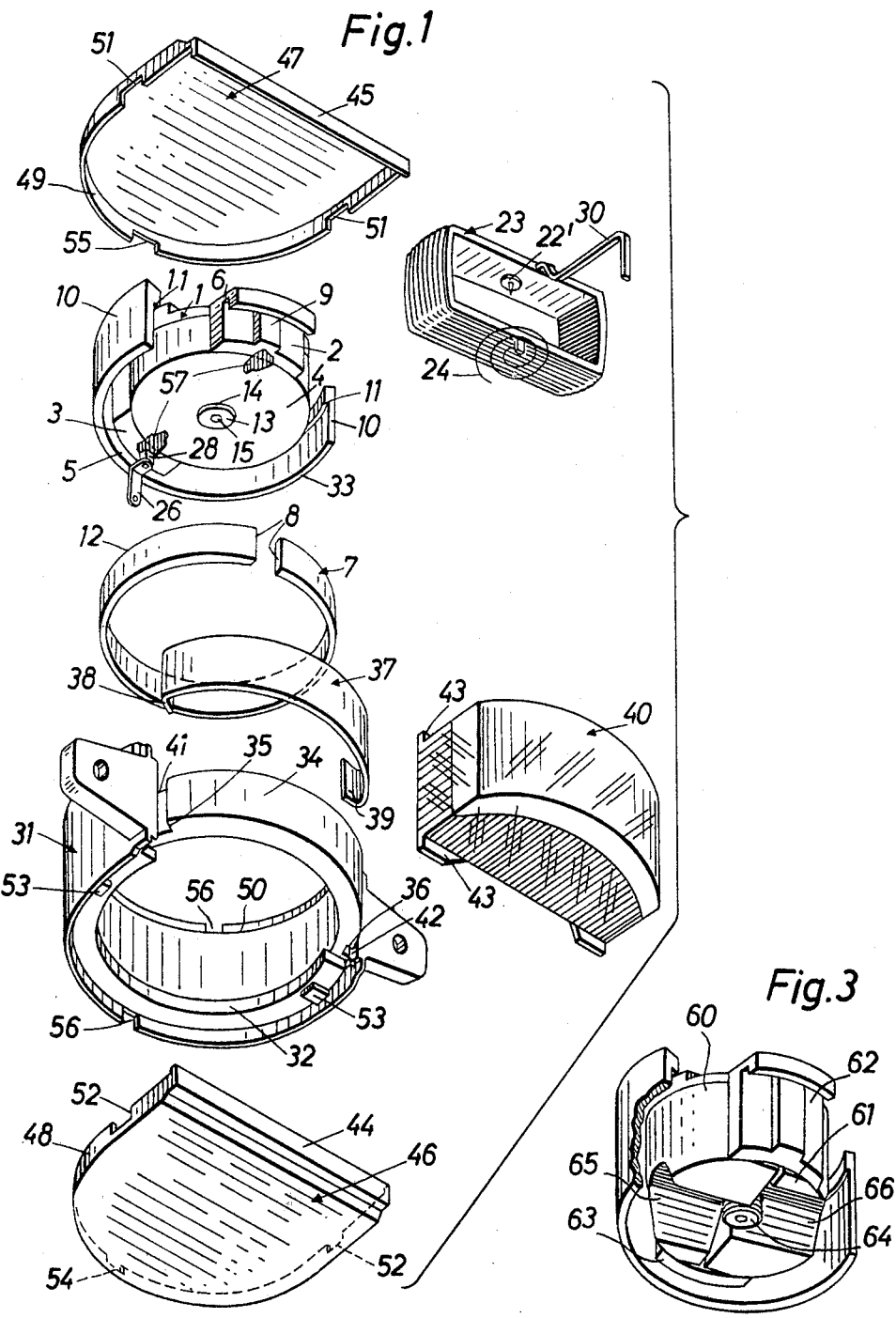
FIG. 1 is an exploded perspective view of a moving-coil instrument which embodies my invention.

Referring to the drawings, there is shown a core-magnet moving-coil instrument which comprises a holder 1 consisting of synthetic plastic material which is shaped in an injection molding machine or in another suitable way. The holder 1 is provided with two jaws 2, 3 which extend from one of its sides, and the internal surfaces of these jaws are of arcuate shape so that they follow the periphery of an annular magnetic core 4. Blobs 57 of suitable adhesive are used to provide a shock- and vibration-proof connection between the holder 1 and core 4.

The jaws 3, 2 are respectively formed with arcuate slots 5, 6 which receive a split magnetic yoke 7. The axially extending faces 8 of the yoke 7 abut against the respective side faces of a web 9 which is located midway between the ends of the slot 6, see FIG. 1. The outer side of the slot 5 is bounded by an arcuate wall 10 which forms part of the jaw 3 and is provided with an internal shoulder 11 for the arcuate end face 12 at one axial end of the yoke 7. The periphery of the yoke 7 abuts against the internal surface of the wall 10.

Figure 2:
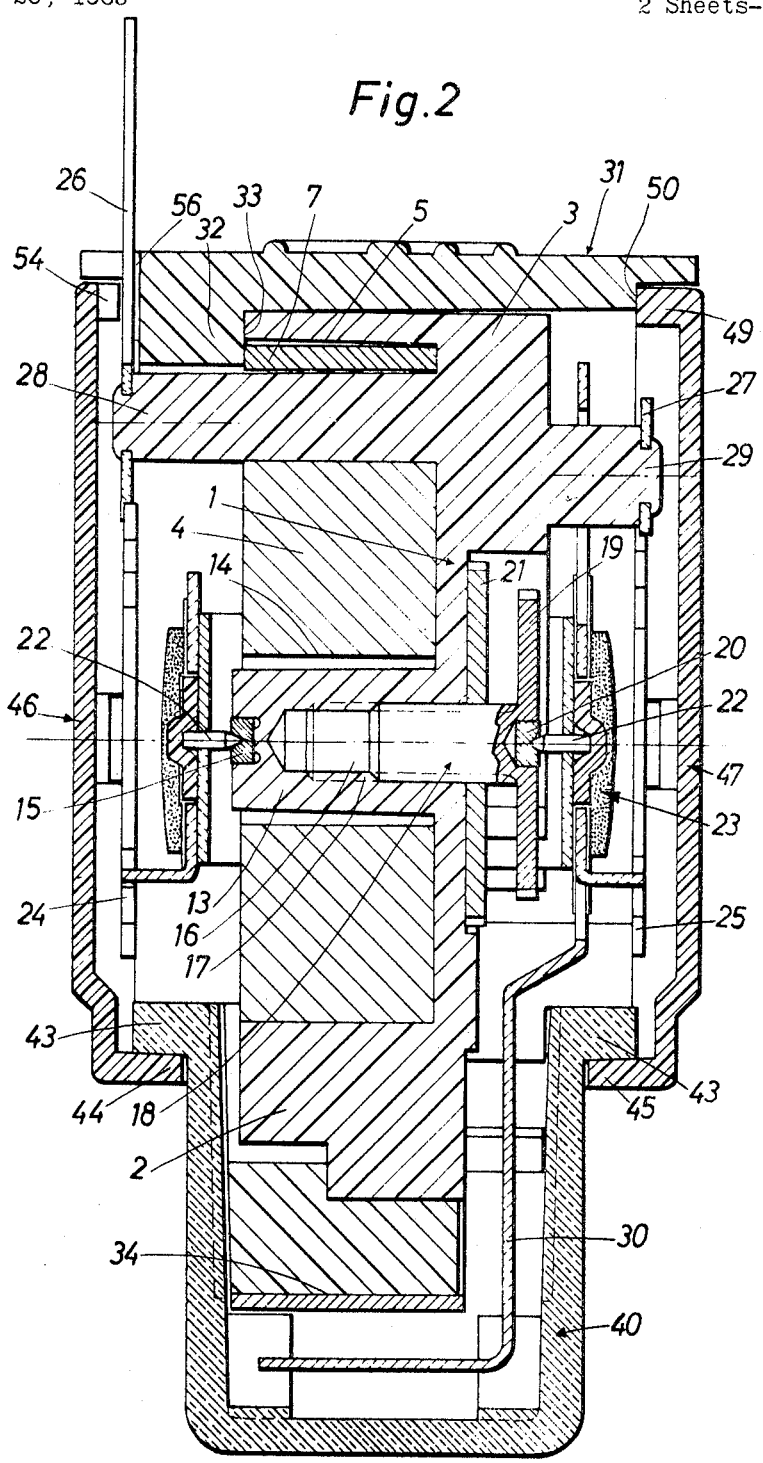
FIG. 2 is an enlarged axial section through a fully assembled instrument.

That side of the holder 1 from which the jaws 2 and 3 extend is provided with a centrally located hub or boss 13 which projects through the aperture 14 of the annular core 4. The end face of the hub 13 is formed with a centrally located recess which accommodates a jewel 15 or a metallic socket for the tip on the pivot member or arbor 22 of a moving coil 23. The other side of the holder 1 is formed with a centrally located blind bore 16 which is tapped, as at 17, to receive one end portion of a threaded shaft 18. The other end portion of the shaft 18 is rigid with a disk-shaped support 19 whose outer side is formed with a centrally located recess for a second jewel or metallic socket 20 serving to receive the tip of a second pivot member or arbor 22' secured to the frame of the moving coil 23. The socket 20 registers with the socket 15 and each of these sockets has a hole which is coaxial with the hub 13. The shaft 18 may be fixed in a selected axial position by a lock nut 21 which meshes therewith and bears against the right-hand side of the holder 1, as the parts appear in FIG. 2. The axial position of the shaft 18 is selected in such a way that the tips of arbors 22, 22' are received without undesirable play in the concial holes of the sockets 15, 20. The convoluted conductor of the coil 23 is connected with current-conducting springs 24, 25 which are connected with terminals 26, 27. These terminals are non-rotatably mounted on projecting posts 28, 29 which are integral with the holder 1. It is preferred to make the posts 28, 29 of polygonal outline and to provide the terminals 26, 27 with complementary openings so that the terminals are kept against rotation with reefrence to such posts. As shown in FIG. 2, the end portions of the posts 28, 29 are upset so that they hold the terminals against axial movement. Such upsetting may be achieved by localized melting and subsequent deforming of the material of the holder 1. The frame of the moving coil 23 is further connected with a pointer 30 which is suitably deformed so that its bent-over portion may oscillate in front of a graduated scale provided on a scale-bearing strip 37. The moving coil 23 may be constructed and assembled in a manner as disclosed in my copending application Ser. No. 442,891 entitled "Coil for Moving-Coil Instruments and Method of Producing the Same," now Patent No. 3,388,329.

The instrument of my invention further comprises an annular housing 31 which preferably consists of synthetic thermoplastic material and defines a circular chamber to receive the holder 1 with all parts which are mounted on or secured to this holder. The housing 31 is open at both axial ends and is formed with an internal annular rib 32 one side of which comes in abutment with the arcuate end face 33 of the wall 10 when the holder is inserted into the housing in a manner as shown in FIG. 2. The aforedescribed parts of the instrument are preferably dimensioned in such a way that the holder 1 may be inserted into its chamber by exertion of a minimal force.

The housing 31 comprises a reinforced dovetailed peripheral portion or back support 34 which is bounded by two axially extending retaining faces 35, 36 making with each other an angle which exceeds 90 degrees. The convex outer side of the back support 34 abuts against the inner side of the scale-bearing strip 37 which is provided with inwardly bent lugs 38, 39 engaging the stop faces 35, 36 to hold the strip 37 against the outer side of the back support. This strip 37 preferably consists of elastically deformable material so that the lugs 38, 39 bear against the respective stop faces and hold the scale in requisite position in which the bent-over tip of the pointer 30 extends in front of the scale. The strip 37 is locked in such position by a transparent cap 40 which preferably consists of synthetic plastic material. The rear edges of the shorter sides on the cap 40 extend into spaces 41, 42 which are adjacent to the lugs 38, 39 so that the lugs are straddled by the adjoining portions of such shorter side walls and cannot become disengaged from the stop faces 35, 36 unless the cap 40 is detached from the housing 31. The cap 40 is provided with tongues 43 which are engaged by the straight front edge portions 44, 45 of two plate-like end walls or lids 46, 47 serving to close the axial ends of the housing 31. Thus, the cap 40 is held against axial or any other movement as soon as the lids 46, 47 are properly assembled with the housing 31.

The lids 46, 47 further comprise arcuate edge portions 48, 49 the latter of which abuts against an internal shoulder 50 of the housing 31, see FIG. 2. The edge portion 48 of the lid 46 abuts against the corresponding side of the rib 32. In order to prevent uncontrolled angular displacements of the lids 46, 47, their edge portions 48, 49 are formed with cutouts 51, 52 which receive complementary protuberances 53 of the housing 31. In addition, the edge portions 48, 49 are respectively provided with a second set of cutouts 54, 55 which register with similar cutouts 56 provided in the housing 31. Such registering cutouts 54, 56 and 55, 56 define channels for the terminals 26, 27 so that these terminals may extend from the assembled instrument and may be connected to the poles of a source of electrical energy, not shown. Since the terminals 26, 27 are non-rotatably secured to the holder 1, and since the channels defined by the cutouts 54, 55, 56 are just wide enough to accommodate the corresponding portions of such terminals, these terminals perform the additional function of preventing angular displacements of the holder 1 with reference to the housing 31.

The annular core 4 is a permanent magnet. This permanent magnet may be replaced as shown in FIG. 3 by two semi-circular magnets 60, 61 each of which is then inserted between two jaws 62, 63 and a hub 64. By utilizing two semi-circular magnets as a substitute for the annular core 4, one can more readily influence the characteristics, particularly the linearity of the moving coil 23, by the form of the recesses 65, 66.

Depending on the intended use of the instrument, the scale-bearing strip 37 may be replaced by a strip with a different scale. All connections which must be provided between the component parts of the instrument are preferably formed by soldering, welding or by resorting to a suitable adhesive.

Without further analysis, the foregoing will so fully reveal the gist of the present invetnion that others can, by applying current knowledge, readily adapt it for various applications without omitting features which fairly constitute essential characteristics of the generic and specific aspects of my contribution of the art.

What is claimed as new and desired to be secured by Letters Patent is:

1. In a core-magnet moving-coil instrument, in combination, a holder consisting of synthetic plastic material and having a first side and a second side, said holder comprising a pair of jaws spaced from each other and extending from one of said sides, each of said jaws having an arcuate slot; a magnetic core adjacent to said one side of the holder and located between said jaws an annular magnetic yoke received in said slots and spacedly surrounding said core; a housing defining a substantially circular chamber which accommodates said holder, said core and said yoke, said housing having an external back support and being open at both axial ends thereof; a scale-bearing member detachably secured to said back support, said scale-bearing member comprising an arcuate strip overlying said back support and including a pair of inwardly extending lugs engaging a pair of axially extending stop faces provided on said housing; a transparent cap detachably secured to said housing in front of said scale-bearing member, said cap comprising a pair of side walls overlying said lugs to prevent movements of said scale-bearing member in the circumferential direction of said housing and said cap further comprising tongues extending in the axial direction of said housing; and a pair of end walls connected with the ends of said housing to close said chamber, said end walls having portions overlying said tongues to hold the cap against axial movement with reference to said housing.

2. In a core-magnet moving-coil instrument, in combination, an open-ended housing defining a substantially circular chamber and having a peripheral back support; a scale-bearing member detachably secured to said back support; a transparent cap located in front of said scale-bearing member; a pair of end walls each detachably secured to one end of said housing and engaging a portion of said cap to locate the same in front of said scale-bearing member; a holder consisting of synthetic plastic material and received in said chamber, said holder having a first side adjacent to one of said end walls, a second side adjacent to the other end wall, a pair of jaws spaced from each other and extending from one of said sides, each of said jaws having a slot which is concentric with said chamber, and a centrally located boss extending from said one side between said jaws; and annular magnetic core surrounding said boss and extending between said jaws; an annular magnetic yoke received in said slots and spacedly surrounding said core; a moving coil surrounding a portion of said holder and including pivots coaxial with said boss and journalled in said holder; a pointer connected with said coil and having a portion extending between said scale-bearing member and said cap so that such portion of the pointer is observable through said cap; and a pair of terminals non-rotatably attached to said holder and extending through cutouts provided in said housing, each of said terminals being electrically connected with said coil.

3. In a core-magnet moving-coil instrument, a combination comprising a holder consisting of synthetic plastic material and having a first side and a second side, said holder comprising a pair of jaws spaced from each other and extending beyond one of said sides, each of said jaws having a slot; a magnetic core adjacent to said one side of the holder and located between said jaws; and an annular magnetic yoke received in said slots and surrounding said core, said jaws permitting unobstructed movements of said core and said yoke in directions toward and away from said one side of the holder.

4. A combination as defined in claim 3, wherein said jaws and said slots are of arcuate shape, each of said jaws further having an arcuate inner side concentric with the respective slot and abutting against said core, said yoke being a split annular magnetic yoke.

5. A combination as defined in claim 3, wherein said holder further comprises a boss provided centrally between said jaws, said core being of annular shape and surrounding said boss and further comprising a first socket coaxially mounted on said boss, a second socket aligned with said first socket and mounted at the other side of said holder, and a moving coil surrounding a portion of said holder and having pivot means received in said sockets so that the coil is turnable about the axis of said boss.

6. A combination as defined in claim 5, wherein said boss has an end face and wherein said other side of the holder is provided with a tapped bore coaxial with said boss, first socket being recessed in the end face of said boss and further comprising a threaded shaft extending into said tapped bore and comprising a support at said other side of the holder, said second socket being recessed into said support, each of said pivot means comprising an arbor each of which extends into one of said sockets.

7. A combination as defined in claim 3, further comprising a pair of posts rigid with and extending from the opposite sides of said holder and a pair of current-conducting terminals each non-rotatably secured to one of said posts.

8. A combination as defined in claim 3, wherein one of said jaws comprises an arcuate wall surrounding a portion of said yoke and having an internal annular shoulder abutting against one end face of said yoke.

9. A combination as defined in claim 3, wherein said core comprises two semicircular magnets and wherein said holder further comprises a boss rigid therewith and extending through said core.

10. A combination as defined in claim 3, further comprising a housing defining a substantially circular chamber for said holder, said core and said yoke.

11. A combination as defined in claim 10, wherein said housing is an open-ended housing and further comprising a pair of end walls connected with the ends of said housing and a pair of current-conducting terminals non-rotatably secured to said holder and extending through cutouts provided in said housing.

12. A combination as defined in claim 3, further comprising means for bonding at least said core to said holder.

References Cited
UNITED STATES PATENTS

| | | | |
|---|---|---|---|
| 2,871,450 | 1/1959 | Podoloff | 324—156 X |
| 2,887,657 | 5/1959 | Lamb | 324—156 X |
| 3,141,133 | 7/1964 | Wahlstedt. | |
| 3,298,351 | 1/1967 | Koza | 324—156 X |

RUDOLPH V. ROLINEC, Primary Examiner

A. E. SMITH, Assistant Examiner

U.S. Cl. X.R.

324—146; 335—222